United States Patent [19]
Chien

[11] Patent Number: 6,049,193
[45] Date of Patent: Apr. 11, 2000

[54] METHOD AND DEVICE FOR EXECUTING A BATTERY AUTO-LEARNING

[75] Inventor: Chih-Hsiang Chien, Hisn Tien, Taiwan

[73] Assignee: Twinhead International Corp., Hsin Tein, Taiwan

[21] Appl. No.: 09/219,680

[22] Filed: Dec. 23, 1998

[51] Int. Cl.[7] .......................... H02J 7/00; G01N 27/416
[52] U.S. Cl. ..................... 320/132; 320/128; 324/432
[58] Field of Search .................................. 320/132, 128, 320/107; 324/432

[56] References Cited

U.S. PATENT DOCUMENTS

| | | | |
|---|---|---|---|
| 5,751,134 | 5/1998 | Hoerner et al. | 320/124 |
| 5,955,869 | 9/1999 | Rathmann | 320/132 |

OTHER PUBLICATIONS

Unitrode, "bq2040—Gas Gauge IC With SMBus Interface", Jun. 1999.

*Primary Examiner*—Edward H. Tso
*Assistant Examiner*—Gregory J Toatley, Jr.
*Attorney, Agent, or Firm*—Alston & Bird LLP

[57] ABSTRACT

A method and device for executing battery auto-learning applied to a portable data processor with a rechargeable battery and a current gauge is disclosed. The device includes a charging device, a first switch and a second switch controlled by the portable data processor. The notebook computer can control the first switch, the second switch and the charging device automatically so that the battery learning process can be executed automatically instead of being operated manually. It can save a lot of manufacturing cost and time. Moreover, if the user wants to eliminate the memory effect of the rechargeable battery, he can set the executing times for executing the battery auto-learning to achieve the purpose.

27 Claims, 3 Drawing Sheets

METHOD AND DEVICE FOR EXECUTING A BATTERY AUTO-LEARNING

FIELD OF THE INVENTION

The present invention relates to a method and a device for executing a battery learning, and more particularly to a method and a device for executing a battery auto-learning applied to a portable data processor with a rechargeable battery and a current gauge.

BACKGROUND OF THE INVENTION

As we know, the electric products have a tendency to become smaller in volume for a convenient portability. A notebook computer is getting more and more popular due to its small volume, portability and multifunctionality. There is a rechargeable battery provided for the notebook computer so that the notebook computer can be used in any place. However, a rechargeable battery can only store a limited electric capacity, i.e. a limited amount of charges. Hence, the user needs to know the residual electric capacity of the rechargeable battery in order to prepare previously before the electric capacity of the rechargeable battery is run out.

Please refer to FIG. 1 showing a schematic diagram of a general device for determining the residual electric capacity of the rechargeable battery. As shown in FIG. 1, the current gauge 11 is a BQ2040 gas gauge board. The current gauge 11 counts the input electric charges and output electric charges charged and discharged between the notebook computer 12 and the rechargeable battery 10 by using a counter, calculates the residual capacity of the rechargeable battery, and then show the counted electric capacity on the display through the notebook computer 12.

However, the current gauge 11 needs to be calibrated by executing a battery learning before being used. The process is simply described as follows. Firstly, the rechargeable battery 10 needs to be charged until the rechargeable battery 10 approaches a first saturation state. Secondly, the rechargeable battery 10 is discharged and the current gauge 11 counts the electric capacity discharged from the rechargeable battery 10. When the rechargeable battery 10 approaches a predetermined minimum capacity condition (a preset lowest residual electric capacity stored in the rechargeable battery 10 corresponding to a lowest voltage value (EDV1) recorded in an electrically erasable programmable readonly memory EEPROM of the current gauge 11 and the lowest capacity of the rechargeable battery 10, such as 2% of the total capacity), the user needs to zero the current gauge 11 and then recharges the rechargeable battery 10. After the rechargeable battery 10 is recharged, it is discharged and a counter of the current gauge 11 starts to count down according to the current charges output from the rechargeable battery 10. When the voltage reaches lowest voltage value (EDV1), the user needs to stop discharging the rechargeable battery 10 and records the electric capacity A counted by the current gauge 11. Finally, the rechargeable battery 10 is recharged. When the count counted down exceeds a specific value (for example 256), that the recharging process and the A value is correct is confirmed. Then, the battery learning ends.

The new total capacity of the rechargeable battery can be calculated according to the A value and the specific discharge condition by the following equation:

The new total capacity of the rechargeable battery=A+2% of the previous total capacity of the rechargeable battery.

Therefore, during the production process of the notebook computer, each of the rechargeable batteries mounted in the notebook computers needs to be executed a battery learning before the notebook computers are sold to customer. Please refer to FIG. 2 showing a general device for executing a battery learning process. A plurality of the notebook computers (211 . . . , and 21n) are electrically connected to a power source 22 through a switch 23 at the same time. Thereafter, the user turns on the switch 23 manually to charge the rechargeable batteries mounted in the notebook computers (211 . . . , and 21n). However, each of the rechargeable batteries mounted in the notebook computers has a different residual electric capacity. Hence, the user needs to charge all of the rechargeable batteries mounted in the notebook computers for a longer time in order to insure that each of the rechargeable batteries is in a saturation state. Then, the user turns off the switch 23 manually to discharge the rechargeable batteries mounted in the notebook computers. Certainly, it also costs the user a lot of time to discharge the rechargeable batteries in order to insure that the residual electric capacity stored in each of the rechargeable batteries is in a lowest state and the discharging process is completed.

However, by the above-described method and device, it may cost the user a lot of time to execute a battery learning process resulting in a low production efficiency. Moreover, the general method and device for executing a battery learning is very complex so that the user may not actually execute the learning in the production process. Besides, there may be an error value counted by the current gauge due to the wrong process. As we know, the total capacity of the rechargeable battery may decrease after a long time use. Hence, the current gauge needs to be calibrated by executing a battery learning process. However, the user needs to charge and discharge the rechargeable battery manually, and it must cost the user many hours to execute the battery learning process again.

Moreover, a nickel-hydrogen battery applied in those notebook computers usually has a defect of the memory effect. Hence, the rechargeable battery mounted in the notebook computer needs to be executed battery learning processes no less than three times to eliminate the memory effect before the notebook computer are sold. However, the required implement for achieving the purpose is to make tester to invest. It may bring about an increased manufacturing cost. Therefore, it is desirable to develop a method to solve the problems encountered by prior arts.

SUMMARY OF THE INVENTION

The object of the present invention is to provide a method for executing battery auto-learning applied to a portable data processor with a rechargeable battery and a current gauge. The method includes steps of (a) charging the rechargeable battery until the rechargeable battery approaches a first saturation state, (b) resetting the current gauge when the portable data processor detects a first saturation state of the rechargeable battery, and a counter of the current gauge starting to count down based on the charges output from the rechargeable battery during discharging, (c) discharging the rechargeable battery and counting the electric capacity discharged from the rechargeable battery by the current gauge, (d) stopping discharging the rechargeable battery and memorizing the electric capacity counted by the current gauge when the portable data processor detects a specific discharge state of the rechargeable battery, (e) recharging the rechargeable battery to a second saturation state of the rechargeable battery, and (f) calculating a new total capacity of the rechargeable battery according to the count value and the specific discharge state. The new total capacity =count value +a few percentage of predetermined minimum capacity of the previous total capacity.

In accordance with one aspect of the present invention, the step (e) further includes a step of (e1) checking whether the rechargeable battery is in a specific recharge state. The specific recharge state is a recharge state when the variance of the count value exceeds a specific value, then it is decided that the step (e) of recharging the rechargeable battery should be carried out. Preferably, the specific value in the auto-learning method is 256. The percentage of the predetermined minimum capacity is 2%. The new total capacity is equal to a sum of the count value and the previous lowest residual electric capacity of the rechargeable battery.

In accordance with another aspect of the present invention, after the step (e1), the method further includes a step of (e2) stopping charging the rechargeable battery and shutting down the portable data processor when the portable data processor detects a second saturation state of the rechargeable battery.

In accordance with another aspect of the present invention, in the method, the portable data processor is a notebook computer, and the current gauge for the rechargeable battery is a BQ2040 gas gauge board.

In accordance with another aspect of the present invention, in the method for executing battery auto-learning, the specific discharge state (the predetermined minimum capacity condition of the rechargeable battery) is met by approaching the lowest voltage value of the EDV1 recorded in EEPROM of the current gauge and the lowest residual electric capacity percentage. When the current gauge detects the output voltage of the rechargeable battery equal to lowest voltage value of EDV1 recorded in EEPROM of the current gauge, the rechargeable battery stops to discharge and the remaining capacity is the lowest residual electric capacity percentage.

Another object of the present invention is to provide a battery auto5 learning device applied between a portable data processor and a rechargeable battery with a current gauge for executing battery autolearning. The device includes a charging device electrically connected between a utility power source and the rechargeable battery for charging the rechargeable battery, a first switch electrically connected between the utility power source and the charging device and controlled by the portable data processor, and a second switch electrically connected between the rechargeable battery and the portable data processor and controlled by the portable data processor. When the portable data processor enters learning mode, the following steps are carried out. The portable data processor renders the first switch in the conduction state so that a charging device charges the rechargeable battery to execute the first charging procedure. When the portable data processor detects that the rechargeable battery is charged to a saturation state, the first switch is in a turning off state in order to stop the first charging procedure and to reset the current gauge. The second switch is in a conduction state in order to carry out a discharging procedure, and the current gauge starts to count down according to the amount of charges output from the rechargeable battery. When the rechargeable battery is discharged to a predetermined minimum capacity condition, the second switch is turn off in order to stop the discharging procedure and to record the count value in the current gauge.

In accordance with one aspect of the present invention, the portable data processor is a notebook computer and the current gauge is a BQ2040 gas gauge board. The first and second switches are metal oxide semiconductor field-effect transistors (MOSFET). The charging device further includes a charging controller for detecting the state of the rechargeable battery and a charger for charging the rechargeable battery. There is an adapter electrically connected to the utility power source for converting a utility power to a direct current.

In accordance with another aspect of the present invention, the first switch and second switch are controlled by a basic input/output system (BIOS) of the portable data processor. Firstly, the BIOS transmits a first controlling signal for turning on the first switch and turning off the second switch to charge the rechargeable battery until the rechargeable battery approaches a first saturation state. Thereafter, the charging device outputs a second controlling signal through a chipset of PIIX4E to the BIOS when the charging device detects the first saturation state of the rechargeable battery. When the BIOS receives the second controlling signal transmitted from the charging device, the BIOS transmits a third controlling signal for turning off the first switch to stop charging the rechargeable battery and zeroing the current gauge, and then turning on the second switch to discharge the rechargeable battery. At the same time, the current gauge counts the electric capacity discharged from the rechargeable battery.

The BIOS transmits a forth controlling signal for turning off the second switch to stop discharging the rechargeable battery and memorizing the count value A counted by the current gauge, and then turning on the first switch to charge the rechargeable battery when the BIOS detects a specific discharge state of the rechargeable battery. Then, the BIOS transmits a fifth controlling signal for turning off the first switch to stop charging the rechargeable battery and ending the battery auto-learning when the BIOS detects a second saturation state of the rechargeable battery.

In accordance with another aspect of the present invention, the BIOS checks whether the rechargeable battery is in a specific recharge state when the variance of the count value is greater than a specific value. Preferably, the specific value is 256.

In accordance with another aspect of the present invention, the rechargeable battery has a new total capacity equal to a sum of the count value A and a few percentage of predetermined minimum capacity of the previous total capacity. Preferably, the few percentage of predetermined minimum capacity is 2%.

In accordance with another aspect of the present invention, the specific discharge state (the predetermined minimum capacity condition of the rechargeable battery) is met by approaching the lowest voltage value (EDV1) recorded in EEPROM of the current gauge and the lowest residual electric capacity percentage. When the current gauge detects the output voltage of the rechargeable battery equal to lowest voltage value (EDV1) recorded in EEPROM of the current gauge, the rechargeable battery stops to discharge and the remaining capacity is the lowest residual electric capacity percentage.

A further object of the present invention is to provide a battery auto-learning device applied between a portable data processor and a rechargeable battery with a current gauge for executing battery auto-learning. The device includes a charging device electrically connected between a utility power source and the rechargeable battery for charging the rechargeable battery; a first switch electrically connected to the utility power source and the charging device for opening and closing a circuit controlled by a basic input/output system (BIOS); and a second switch electrically connected to the rechargeable battery and the BIOS for opening controlled by the first switch, wherein the second switch has a switching state opposite to that of the first switch.

DETAILED DESCRIPTION OF THE PREFERRED EMBODIMENTS

Figure 1:
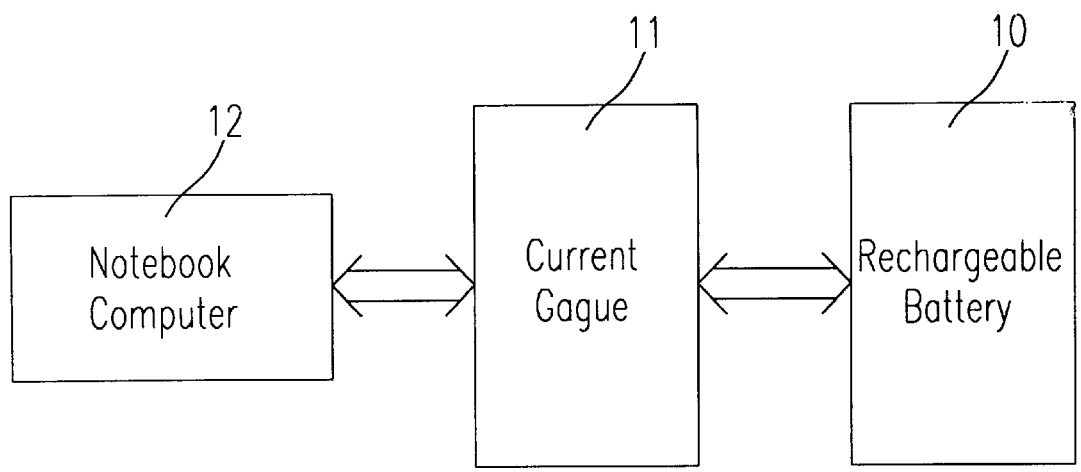
FIG. 1 is a schematic diagram showing a general device for determining the residual electric capacity of a rechargeable battery.
Figure 2:
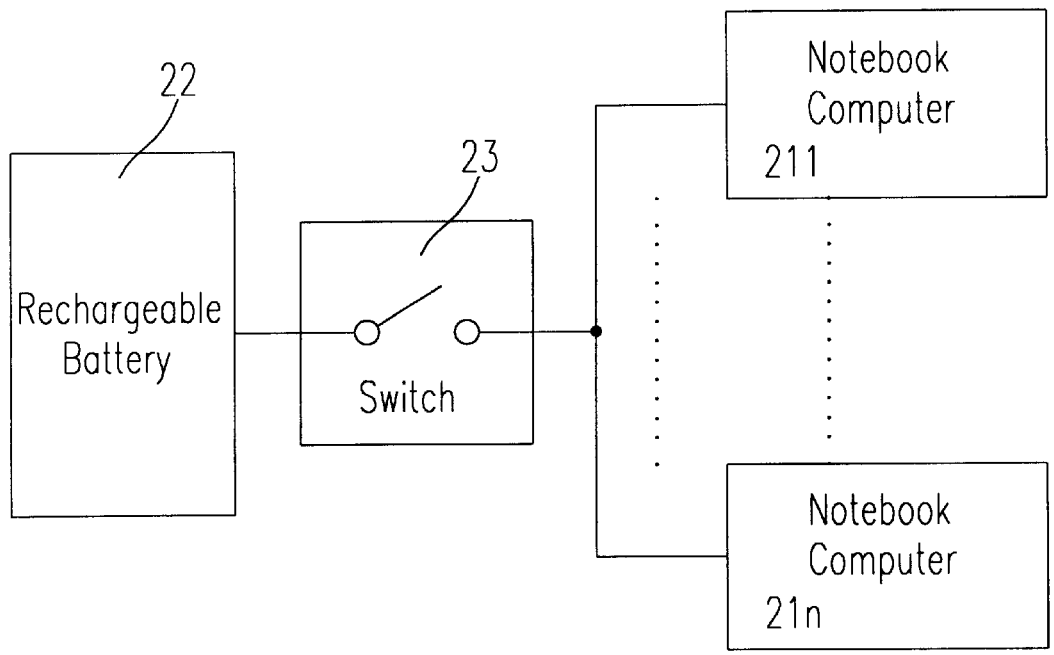
FIG. 2 is a schematic diagram showing a general device for executing a battery learning process.
Figure 3:
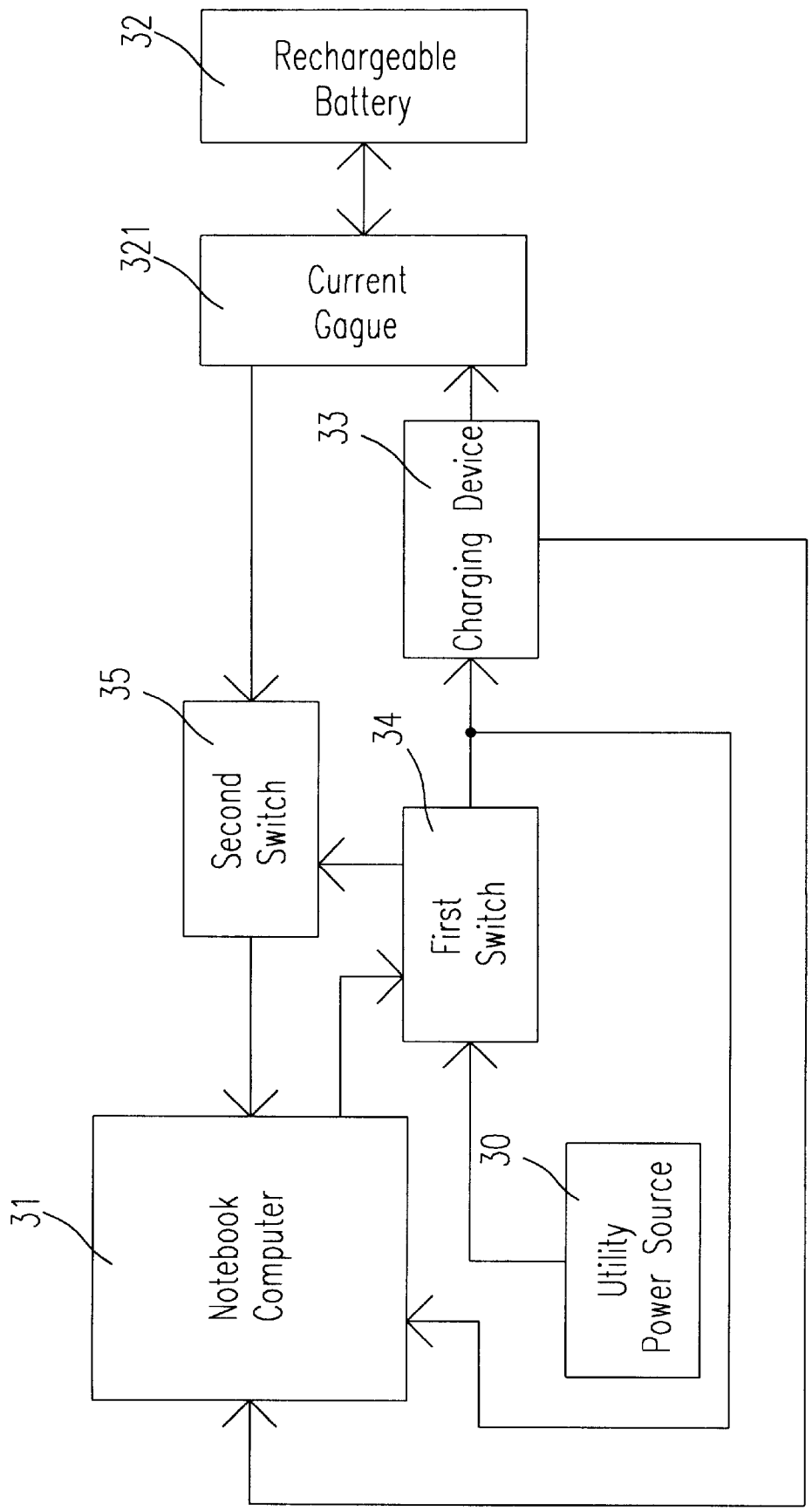
FIG. 3 is a schematic diagram showing a preferred embodiment of the battery auto-learning device of the present invention.

Please refer to FIG. 3 showing a preferred embodiment of the battery auto-learning device of the present invention. The battery auto-learning device applied between a portable data processor and a rechargeable battery with a current gauge for executing battery auto-learning includes a charging device 33 electrically connected between an utility power source 30 and a rechargeable battery 32 for charging the rechargeable battery 32. Preferably, the portable data processor is a notebook computer. There is a first switch 34 electrically connected between the utility power source 30 and the charging device 33 and controlled by the notebook computer 31. Besides, there is still a second switch 35 electrically connected between the rechargeable battery 32 and the notebook computer 31 and controlled by the notebook computer 31. When a user give a command to the notebook computer 31 to execute the battery auto-learning process, the notebook computer 31 begins to execute following steps automatically:

Firstly, the notebook computer 31 transmits a first controlling signal for turning on the first switch 34 and turning off the second switch 35 so that the charging device 33 enables to charge the rechargeable battery 32 until the rechargeable battery 32 approaches a first saturation state. Secondly, when the charging device 33 detects the first saturation state of the rechargeable battery 32, the charging device 33 outputs a second controlling signal to the notebook computer 31. Thereafter, the notebook computer 31 transmits a third controlling signal for turning off the first switch 34 to stop charging the rechargeable battery 32, resetting the current gauge 321, and then turning on the second switch 35 to discharge the rechargeable battery 32 when the notebook computer 31 receives the second controlling signal transmitted from the charging device 321. At the same time, the current gauge 321 counts the electric capacity discharged from rechargeable battery 32.

When the notebook computer 31 detects that the rechargeable battery 32 approaches a specific discharge state (a preset lowest residual electric capacity stored in the rechargeable battery corresponding to a lowest voltage value (EDV1) recorded in an electrically erasable programmable readonly memory EEPROM of the current gauge 321 and the lowest capacity of the rechargeable battery 32, such as 2% of the total capacity), the notebook computer 31 transmits a forth controlling signal for turning off the second switch 35 to stop discharging the rechargeable battery 32 and memorizing the count value A counted by the current gauge 321, and then turning on the first switch 34 to recharge the rechargeable battery 32. The specific discharge state (the predetermined minimum capacity condition of the rechargeable battery) is met by approaching the lowest voltage value (EDV1) recorded in EEPROM of the current gauge 321 and the lowest residual electric capacity percentage. When the current gauge 321 detects the output voltage of the rechargeable battery 32 equal to lowest voltage value (EDV1) recorded in EEPROM of the current gauge 321, the rechargeable battery 32 stops to discharge and the remaining capacity is the lowest residual electric capacity percentage. Preferably, the lowest residual electric capacity percentage is 2%.

After recharging the rechargeable battery 32, the notebook computer 31 checks whether the rechargeable battery 32 is in a specific recharge state when the variance of the count value is greater than a specific value. Preferably, the specific value is 256. If the count value is greater than 256, the notebook computer 31 transmits a fifth controlling signal for turning off the first switch 34 to stop recharging the rechargeable battery 32, shutting down the notebook computer 31 and then ending the battery auto-learning. Namely, when the notebook computer 31 detects the second saturation state of the rechargeable battery, the battery autolearning is finished.

The new total capacity of the rechargeable battery can be calculated according to the count value A and the specific discharge state by using the following equation:

The new total capacity of the rechargeable battery=A+2% of the previous total capacity of the rechargeable battery.

Figure 4:
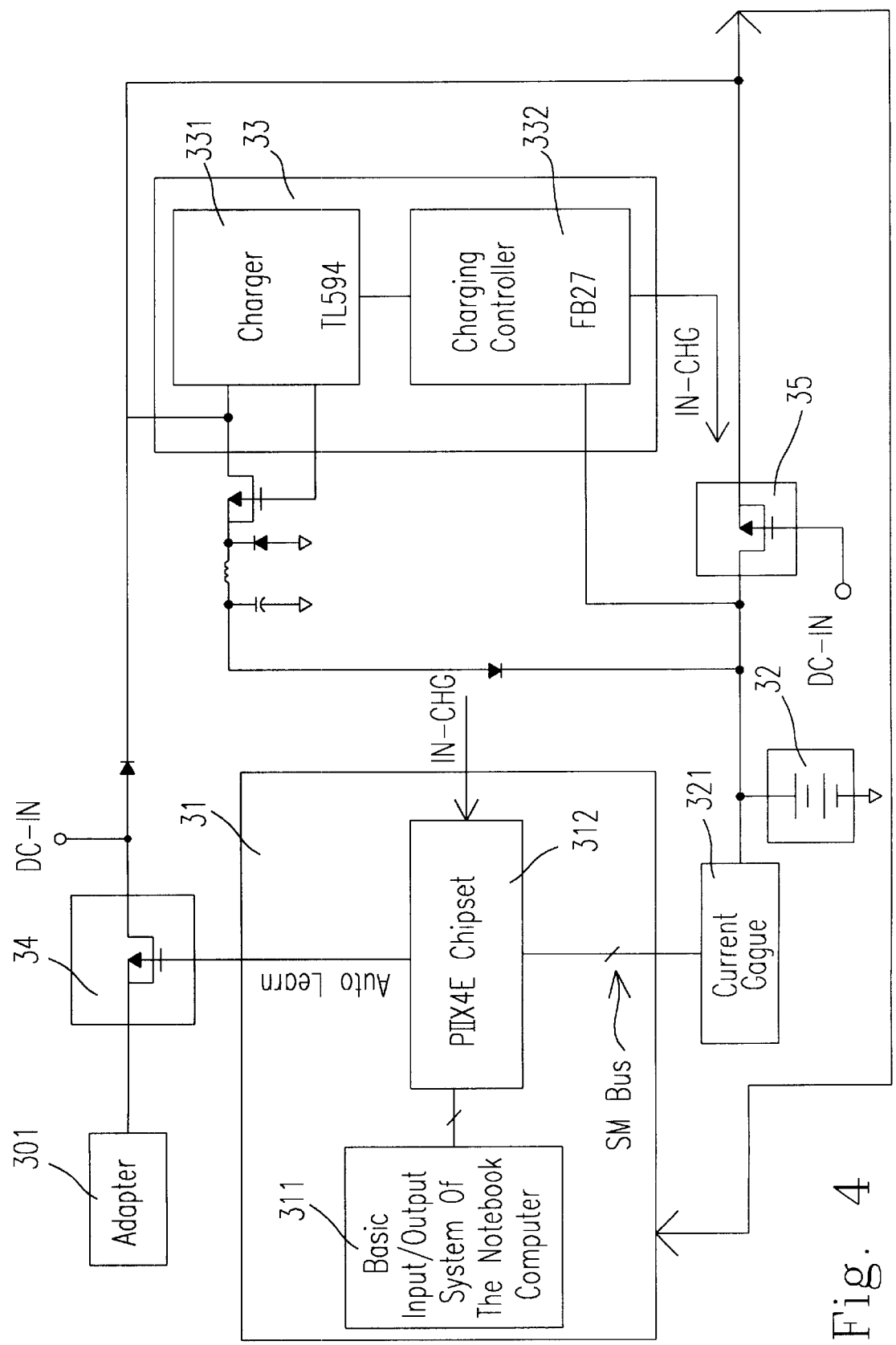
FIG. 4 is a schematic diagram showing the circuit of the battery auto-learning device for the preferred embodiment of the present invention.

Please refer to FIG. 4 showing the circuit of the battery auto-learning device for the preferred embodiment of the present invention. The current gauge 321 is a BQ2040 gas gauge board. The charging device 33 further includes a charging controller 332 for detecting the state of the rechargeable battery 32 and a charger 331 for charging the rechargeable battery 32. There is an adapter 301 electrically connected to the utility power source for converting the utility power to a direct current. The first switch 34 and second switch 35 are metal oxide semiconductor field-effect transistors (MOSFET). The battery auto-learning process is controlled by the basic input/output system (BIOS) 311 of the notebook computer 31. Namely, the first switch 34 and second switch 35 are controlled by the basic input/output system (BIOS) 311 of the notebook computer 31.

When the user give a command to the notebook computer 31 to execute a battery auto-learning process, firstly, the BIOS 311 transmits a first controlling signal for turning on the first switch 34 and turning off the second switch 35 to charge the rechargeable battery 32 until the rechargeable battery 32 approaches a first saturation state. Secondly, when the charging controller 332 of FB27 detects the first saturation state of the rechargeable battery 32, the charging controller 332 outputs a second controlling signal through the chipset 312 of PIIX4E to the BIOS 311. Thereafter, the BIOS 311 transmits a third controlling signal for turning off the first switch 34 to stop charging the rechargeable battery 32, zeroing the current gauge 321, and then turning on the second switch 35 to discharge the rechargeable battery 32 when the BIOS 311 receives the second controlling signal transmitted from the charging controller 332. At the same time, the current gauge 321 counts the electric capacity discharged from rechargeable battery 32.

When the BIOS 311 detects that the rechargeable battery 32 approaches a specific discharge state (a preset lowest residual electric capacity stored in the rechargeable battery 32 corresponding to a lowest voltage value (EDV1) recorded in a EEPROM of the current gauge 321 and the lowest capacity of the rechargeable battery 32, such as 2% of the total capacity) through the SM bus from the current gauge 321, the BIOS transmits a forth controlling signal for turning off the second switch 35 to stop discharging the rechargeable battery 32 and memorizing the count value A counted by the current gauge 321, and then turning on the first switch 34 to recharge the rechargeable battery 32. The specific discharge state (the predetermined minimum capacity condition of the rechargeable battery) is met by approaching the lowest voltage value (EDV1) recorded in EEPROM of the current gauge and the lowest residual electric capacity percentage. When the current gauge 321 detects the output voltage of the rechargeable battery 32 equal to lowest voltage value (EDV1) recorded in EEPROM of the current gauge 321, the rechargeable battery 32 stops to discharge and the remaining capacity is the lowest residual electric capacity percentage. Preferably, the lowest residual electric capacity percentage is 2%.

After the rechargeable battery 32 is recharged, the BIOS 311 transmits a fifth controlling signal for turning off the first switch 34 to stop recharging the rechargeable battery 32, shutting down the notebook computer, and then ending the battery auto-learning when the BIOS 311 detects a specific recharge state. The specific recharge state is a recharge state when the variance of the count value is greater than a specific value. Preferably, the specific value is 256. Namely, when the BIOS 311 detects the second saturation state of the rechargeable battery, the battery auto-learning is finished.

The new total capacity of the rechargeable battery can be calculated according to the count value A and the specific discharge state by using the following equation:

The new total capacity of the rechargeable battery=A+2% of the previous total capacity of the rechargeable battery.

In accordance with the above-described method and device, the BIOS of the notebook computer can detect the state of the rechargeable battery through the chipset and the charging device. Moreover, the first switch and the second switch can be controlled by the BIOS instead of plugging on and off the adapter manually. Hence, the battery learning process can be executed automatically instead of being operated manually. It can save a lot of manufacturing cost and time. If the user wants to eliminate the memory effect of the rechargeable battery, he can set the executing times for executing the battery auto-learning to achieve the purpose. Hence, it can solve the troubles encountered by the prior arts.

The above embodiments can be modified by any skillful person in the art without departing the spirit and scope of the accompanying claims.

What is claimed is:

1. A method for executing battery auto-learning applied to a portable data processor with a rechargeable battery and a current gauge comprising steps of:
   (a) charging said rechargeable battery until said rechargeable battery approaches a first saturation state;
   (b) resetting said current gauge when said portable data processor detects a first saturation state of said rechargeable battery;
   (c) discharging said rechargeable battery and counting the electric capacity discharged from said rechargeable battery by said current gauge;
   (d) stopping discharging said rechargeable battery and memorizing a count value counted by said current gauge when said portable data processor detects a specific discharge state of said rechargeable battery;
   (e) recharging said rechargeable battery to a second saturation state of said rechargeable battery; and
   (f) calculating a new total capacity of said rechargeable battery according to said count value counted by said current gauge and said specific discharge state.

2. The method according to claim 1 wherein said new total capacity is equal to a sum of said count value counted by said current gauge and a few percentage of predetermined minimum capacity of a previous total capacity.

3. The method according to claim 2 wherein said specific discharge state is a predetermined minimum capacity condition of said rechargeable battery which is met by approaching a lowest voltage value (EVD1) recorded in an electrically erasable programmable readonly memory EEPROM of said current gauge and a lowest residual electric capacity percentage.

4. The method according to claim 3 wherein in said step (d), said rechargeable battery stops to discharge, and a remaining capacity of said rechargeable battery is said lowest residual electric capacity percentage when said current gauge detects an output voltage of said rechargeable battery equal to a lowest voltage value (EDV1) recorded in EEPROM of said current gauge.

5. The method according to claim 4 said lowest residual electric capacity percentage is 2%.

6. The method according to claim 1 wherein said step (e) further includes a step of (e1) checking whether said rechargeable battery is in a specific recharge state when the variance of the count value is greater than a specific value.

7. The method according to claim 6 wherein said specific value is 256.

8. The method according to claim 1 wherein after said step (e1), said method further includes a step of (e2) stopping charging said rechargeable battery and shutting down said portable data processor when said portable data processor detects a second saturation state of said rechargeable battery.

9. The method according to claim 1 wherein said portable data processor is a notebook computer, and said current gauge is a BQ2040 gas gauge board.

10. A battery auto-learning device applied between a portable data processor and a rechargeable battery with a current gauge for executing battery auto-learning comprising:
   a charging device electrically connected between a utility power source and said rechargeable battery for charging said rechargeable battery;
   a first switch electrically connected between said utility power source and said charging device and controlled by said portable data processor; and
   a second switch electrically connected between said rechargeable battery and said portable data processor and controlled by said portable data processor.

11. The battery auto-learning device according to claim 10 wherein said portable data processor is a notebook computer, and said current gauge is a BQ2040 gas gauge board.

12. The battery auto-learning device according to claim 10 wherein said charging device further includes a charging controller for detecting a state of said rechargeable battery and a charger for charging said rechargeable battery.

13. The battery auto-learning device according to claim 10 wherein said first and second switches are metal oxide semiconductor field-effect transistors (MOSFET) and controlled by a basic input/output system (BIOS) of said portable data processor.

14. The battery auto-learning device according to claim 13 wherein said BIOS transmits a first controlling signal for turning on said first switch and turning off said second switch to charge said rechargeable battery until said rechargeable battery approaches a first saturation state.

15. The battery auto-learning device according to claim 14 wherein said charging device outputs a second controlling signal through a chipset of PIIX4E to said BIOS when said charging device detects said first saturation state of said rechargeable battery.

16. The battery auto-learning device according to claim 15 wherein said BIOS transmits a third controlling signal for turning off said first switch to stop charging said rechargeable battery and zeroing said current gauge, and then turning on said second switch to discharge said rechargeable battery when said BIOS receives said second controlling signal transmitted from said charging device.

17. The battery auto-learning device according to claim 16 wherein said current gauge counts the electric capacity discharged from said rechargeable battery.

18. The battery auto-learning device according to claim 17 wherein said BIOS transmits a forth controlling signal for turning off said second switch to stop discharging said rechargeable battery and memorizing a count value counted by said current gauge, and then turning on said first switch to charge said rechargeable battery when said BIOS detects a specific discharge state of said rechargeable battery.

19. The method according to claim 18 wherein said specific discharge state is a predetermined minimum capacity condition of said rechargeable battery which is met by approaching a lowest voltage value (EVD1) recorded in an electrically erasable programmable readonly memory EEPROM of said current gauge and a lowest residual electrical capacity percentage.

20. The method according to claim 19 wherein said rechargeable battery stops to discharge, and a remaining capacity of said rechargeable battery is said lowest residual electric capacity percentage when said current gauge detects an output voltage of said rechargeable battery equal to a lowest voltage value (EDV1) recorded in EEPROM of said current gauge.

21. The method according to claim 20 said lowest residual electric capacity percentage is 2%.

22. The battery auto-learning device according to claim 21 wherein said BIOS transmits a fifth controlling signal for turning off said first switch to stop recharging said rechargeable battery and ending said battery auto-learning when said BIOS detects a second saturation state of said rechargeable battery.

23. The battery auto-learning device according to claim 22 wherein said BIOS checks whether said rechargeable battery is in a specific recharge state when the variance of a count value is greater than 256.

24. The battery auto-learning device according to claim 23 wherein said rechargeable battery has a new total capacity equal to a sum of said count value A and a few percentage of predetermined minimum capacity of a previous total capacity.

25. The battery auto-learning device according to claim 10 wherein there is an adapter electrically connected to said utility power source for converting a utility power to a direct current.

26. A battery auto-learning device applied between a portable data processor and a rechargeable battery with a current gauge for executing battery auto-learning, comprising:

a charging device electrically connected between a utility power source and said rechargeable battery for charging said rechargeable battery;

a first switch electrically connected to said utility power source and said charging device for opening and closing a circuit controlled by a basic input/output system (BIOS); and a second switch electrically connected to said rechargeable battery and said BIOS for opening controlled by said first switch, wherein said second switch has a switching state opposite to that of said first switch.

27. A battery auto-learning device applied between a portable data processor and a rechargeable battery with a current gauge for executing battery auto-learning comprising:

a charging device electrically connected between a utility power source and said rechargeable battery for charging said rechargeable battery;

a first switch electrically connected between said utility power source and said charging device and controlled by said portable data processor;

a second switch electrically connected between said rechargeable battery and said portable data processor and controlled by said portable data processor; and when the portable data processor enters battery auto-learning mode, the following steps carried out:

turning on said first switch controlled by said portable data processor so that said charging device charges said rechargeable battery to execute a first charging procedure;

turning off said first switch controlled by said portable data processor in order to stop said first charging procedure and to reset said current gauge when said portable data processor detects that the rechargeable battery is charged to a first saturation state;

turning on said second switch controlled by said portable data processor in order to execute a discharging procedure, and the current gauge starting to count down according to the amount of charges output from said rechargeable battery;

turning off said second switch controlled by said portable data processor in order to stop said discharging procedure and to record a count value counted by said current gauge when said rechargeable battery is discharged to a predetermined minimum capacity condition;

turning on said first switch controlled by said portable data processor so that said charging device enables to recharge said rechargeable battery until said rechargeable battery approaches a second saturation state;

turning off said first switch controlled by said portable data processor in order to stop recharging said rechargeable battery and to end said battery auto-learning when said rechargeable battery approaches said second saturation state.

* * * * *